LIFT MECHANISM FOR TIME RECORDER

Filed Sept. 28, 1954 3 Sheets-Sheet 1

INVENTOR.
Michael Juhas
BY
[signature]
Att'y

Dec. 17, 1957 M. JUHAS 2,816,810

LIFT MECHANISM FOR TIME RECORDER

Filed Sept. 28, 1954 3 Sheets-Sheet 2

INVENTOR.
Michael Juhas

BY H. H. Kulas

Att'y

LIFT MECHANISM FOR TIME RECORDER

Filed Sept. 28, 1954 3 Sheets-Sheet 3

INVENTOR.
Michael Juhas
BY [signature]
Att'y

United States Patent Office 2,816,810

Patented Dec. 17, 1957

2,816,810

LIFT MECHANISM FOR TIME RECORDER

Michael Juhas, Torrington, Conn., assignor to General Time Corporation, New York, N. Y., a corporation of Delaware Application September 28, 1954, Serial No. 458,829

10 Claims. (Cl. 346—83)

The present invention relates to workmen's in-and-out time recorders and more particularly to an improved lift mechanism for positioning a card in the recorder prior to printing.

It is an object of the invention to provide an improved lift mechanism which is positive in operation and which insures that time entries will be imprinted with precision as required for the keeping of neat and accurate employee payroll records.

It is another object to provide a novel lift arrangement for a time recorder which provides a wide region of engagement with the presented edge of a time card when the card is bottomed in the recorder, thereby reducing the chances that the card will become broken or torn as a result of repeated use during a given pay period and in spite of careless or rough insertion by an employee. It is a related object to provide means for operating a printing switch upon bottoming of the card in the recorder but which requires minimum force to be exerted by the card.

It is a further object to provide a lift unit which is of compact unitary construction, permitting it to be used in recorders of various sizes and designs. It is a related object to provide a lift unit which is flexible and almost universal in application and which may be used regardless of the number of entries comprising a lift time cycle. By way of example, the present device is basically capable of use with time cycles requiring up to twenty-two entries in a vertical column, which would accommodate a pay period of three weeks. The present mechanism may, nevertheless, be used for shorter time cycles, for example, one or two weeks, the detailed embodiment to be described being "sixteen-lift," intended for a semi-monthly pay period. It is an object, moreover, to provide a lift mechanism which is capable of use in recorders in which the coordinates are reversed, that is, recorders in which the days are arranged horizontally on the card and in which the "in" the "out" entries are vertical. More specifically, it is an object to provide a lift mechanism having a cycle, measured in terms of total number of lift steps, which is adequate to meet all normal needs and which is capable of minor modification or adjustment so that the steps which are not required for a particular shorter time cycle may be stepped over idly incident to automatic operation and without care or attention on the part of the user of the recorder.

It is an additional object to provide an improved lift mechanism which is proof against jamming or malfunctioning in the event that a time card or foreign object is inadvertently left in the receiver during a lift transition, for example, overnight.

It is still another object to provide a lift mechanism which consists of fewer parts than mechanisms conventionally used.

Finally, it is an object to provide a lift mechanism which is virtually foolproof, which requires no care or maintenance even when operated over long periods of time, which is, nevertheless, inexpensive to manufacture and adjust for a specific mode of operation.

Other objects and advantages of the invention will become apparent upon reading the attached detailed description and upon reference to the drawings in which:

Figure 1 is a general external view of the recorder, including a lift mechanism constructed in accordance with the present invention.

Fig. 1*a* is a schematic diagram showing a typical solenoid drive and lift program device employed in the recorder of Fig. 1.

Figures 2, 4, 5, 6, 6A:
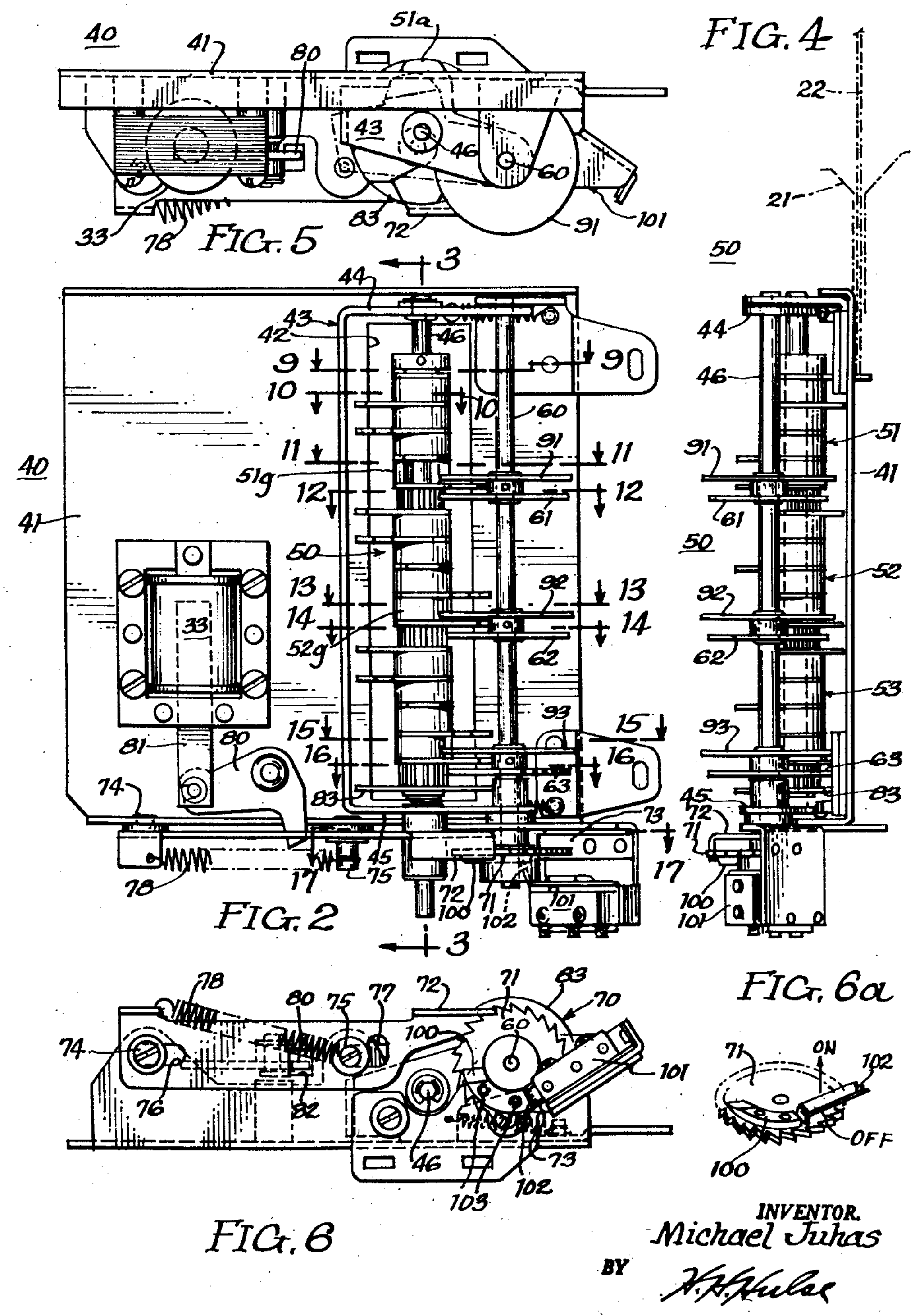
Fig. 4 is a right side elevation of the mechanism shown in Fig. 2.
Figs. 5 and 6 are top and bottom views, respectively, of the mechanism in Fig. 2.
Figure 9:
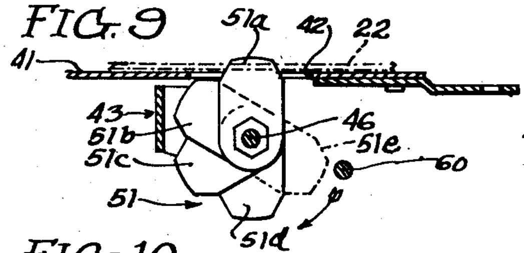

Fig. 6*a* is a fragmentary perspective of the cam operation shown in Fig. 6.

Figures 1, 1A, 2, 3, 8:
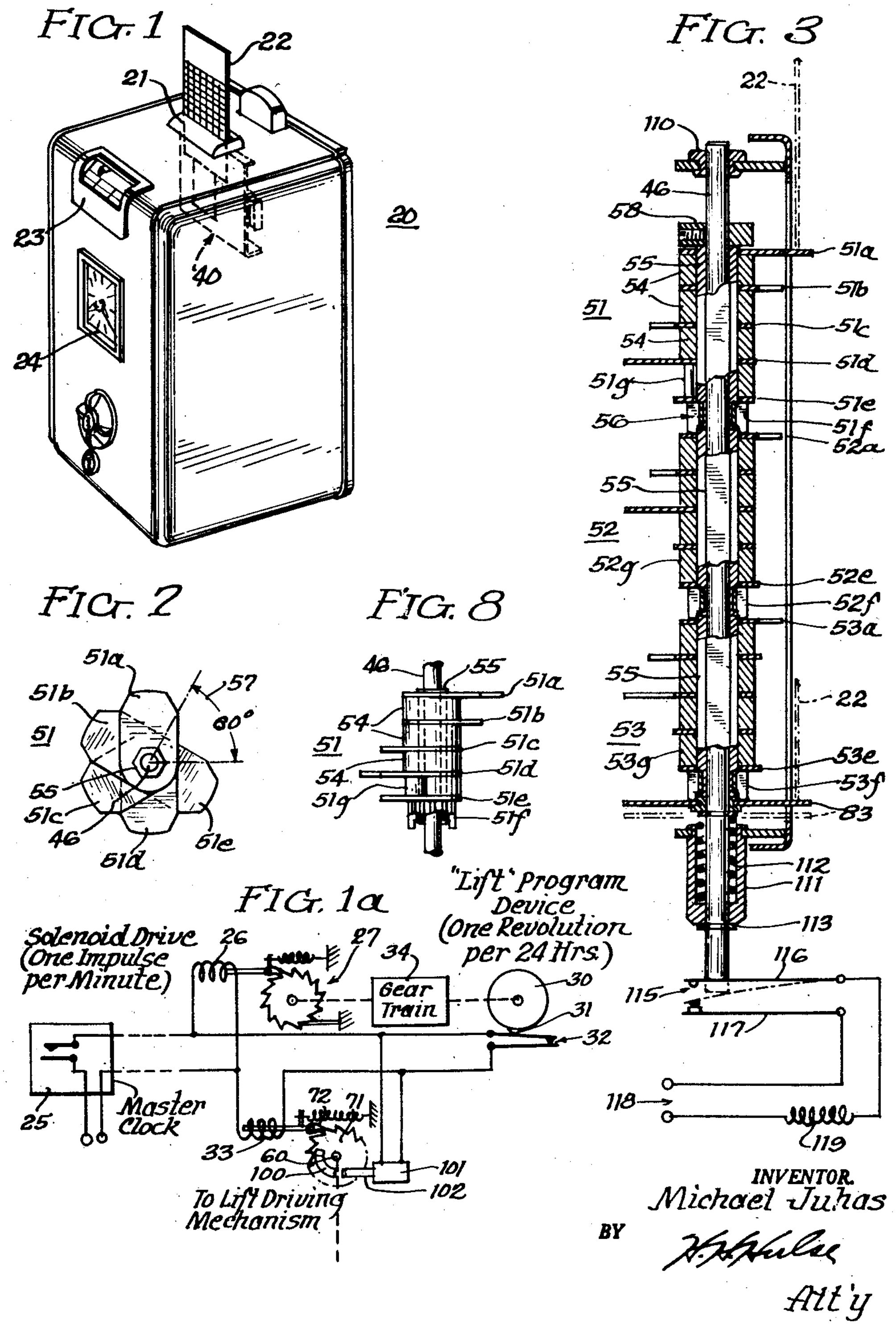
Fig. 2 is a front elevation of the lift mechanism.
Fig. 3 is a vertical section through the step spindle taken along the line 3—3 in Fig. 2.

Figs. 7 and 8 are top and side views of one of the step assemblies.

Figs. 9 to 12, inclusive, are transverse fragmentary sections taken through the first step assembly along corresponding section lines in Fig. 2.

Figures 10, 11, 12, 13, 14:
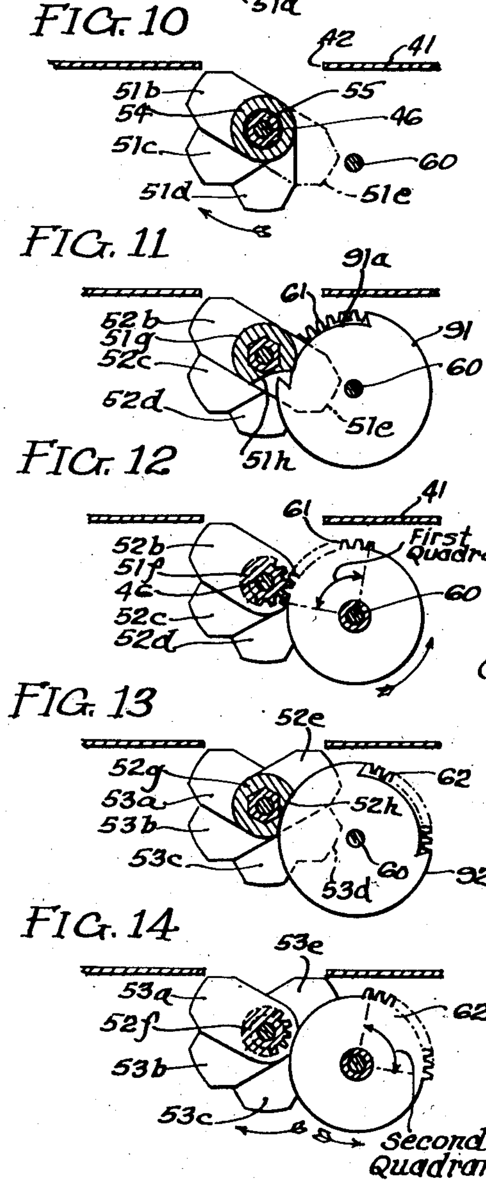

Figs. 13 and 14 are transverse sections taken through the second step assembly in Fig. 2.

Figure 15:
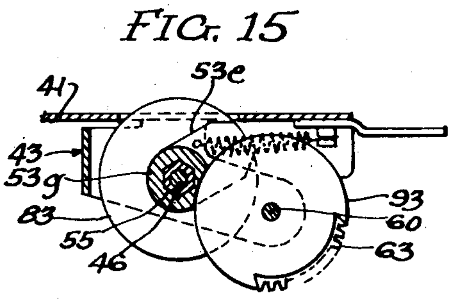
Figure 16:
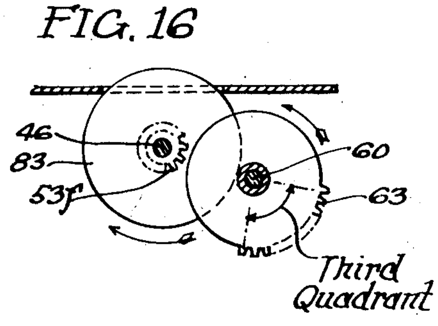

Figs. 15 and 16 are transverse sections taken through the third step assembly in Fig. 2.

Figure 17:
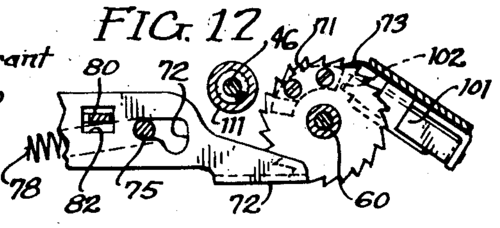

Fig. 17 is a fragmentary section taken along the lines 17—17 in Fig. 2.

Figure 18:
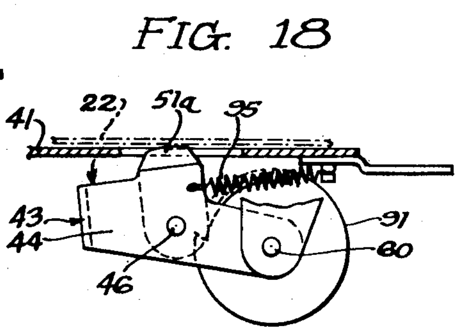

Fig. 18 shows the backward movement of the spindle carriage for avoidance of jamming.

While the invention has been described herein in connection with a preferred embodiment, it will be understood by one skilled in the art that the invention is not limited to such embodiment but includes various alternative constructions and modifications falling within the spirit and scope of the appended claims.

The purpose of the lift mechanism used in a workmen's in-and-out time recorder is to position a time card vertically so that the time imprint is located on the proper line on the card. In one conventional type of time recorder the days of the week are listed in a column down the left hand edge of the card, while the in-and-out times for the various work periods, for example, morning, afternoon, and overtime are listed horizontally. The means for positioning a time card horizontally in a recorder of the present type, generally referred to as a shift mechanism, is covered in my co-pending application, S. N. 458,820, filed September 28, 1954. It will, of course, be understood that the horizontal and vertical coordinates may be interchanged as is done in some types of time recorders. While such interchange does not affect the utility of the present lift mechanism, it will be assumed in the discussion which follows that the days of the week or month are listed vertically on the card, requiring that a step change occur once every twenty-four hours.

In carrying out the present invention a plurality of steps are provided. These steps are radially mounted on a plurality of step assemblies and provision is made for cycling the assemblies in sequence so that the steps are interposed, one at a time, into the path of movement of the time card. With the card solidly bottomed on one of the steps, printing is caused to take place automatically on the appropriate line, after which the card may be removed from the recorder. The structure for accomplishing this, in the various inventive features embodied in such structure, will be covered in the paragraphs which follow.

More general reference will first be made to a typical recorder indicated at 20 in Fig. 1, as well as a simplified solenoid drive and lift program device employed in such recorder, as shown schematically in Fig. 1*a*. The recorder 20 includes a card receiver or funnel 21 into which a time card 22 is inserted. At the front of the case is an in-and-out indicator 23 which shows the column in which the recorder is printing and a clock face 24. As is conventional, the recorder is energized by voltage impulses received from a master clock 25 (Fig. 1*a*) at the rate of one impulse per minute. Such impulses energize a solenoid 26, driving a ratchet mechanism 27 at the rate of one tooth per minute. The output of the ratchet mechanism 27 is stepped down to perform the various functions required in a time clock of the present type. Such functions are described in some detail in co-pending Lorenz application, Serial No. 349,419, filed April 17, 1953, now Pat. No. 2,773,733, issued December 11, 1956. These include the driving of the various program devices required for the shift mechanism, lift mechanism, color change mechanism, signaling mechanism, and the like. For present purposes, attention may be focused on a typical lift program device, consisting of a program wheel 30 having a clip 31 which operates a switch 32. The switch 32 is connected in series with a solenoid 33 which in turn operates the lift driving mechanism causing it to undergo one step of movement. The program wheel 30 is driven at the rate of one revolution for each twenty-four hours by means of a gear train 34. Consequently the lift mechanism to be described will undergo one step of movement at the beginning of each day.

Turning now to Figs. 2–6, inclusive, the details of the present lift mechanism 40 will be apparent. The lift mechanism is mounted on a mounting plate 41, which is secured within the recorder housing in a position lying closely adjacent an inserted card as shown in Fig. 1. All of the mechanism lies to one side of the plate 41, an aperture 42 being provided in the plate for projection of an appropriate one of the steps into the path of movement of a card 22 as shown in Fig. 4. Mounted on the plate 41 is a carriage 43 providing upper and lower brackets 44, 45 for mounting a spindle 46 positioned directly opposite the opening 42. Vertically stacked on the spindle 46 are a set of steps 50 which are mounted in groups of five in step assemblies, indicated at 51, 52 and 53. Individual steps in the step assemblies are designated by the subscripts *a–e*, inclusive.

The construction of a typical step assembly 51 having steps 51–*a* to 51–*e* is shown in Figs. 7 and 8, as well as in Fig. 3. The steps are formed by hardened tongues of metal spaced at 60° intervals about a helical path and separated by suitable washers or spacers 54. In order to insure accurate angular spacing of the steps, each of the steps has a hexagonal hole permitting the steps to be strung or stacked on a central hexagonal core 55. Secured to the bottom of the hexagonal core 55 is a driving pinion 56 which serves to rotate the steps in the assembly together as a unit, for projection individually into an active or card engaging position. It is to be particularly noted that the steps are positioned along the path of a part-turn helix, defining an idle position 57 extending through an arc of 60°. The three step assemblies 51, 52, 53 are kept in assembled condition and prevented moving axially by a collar 58 which is secured to the spindle 46 by a set screw.

In accordance with the present invention, means are provided for rotating each of the step assemblies 51, 52, 53, through its complete cycle of movement in sequence so that all of the steps in the series 50 are projected, one at a time, into the path of movement of the inserted time card 22. During this cycling the inactive assemblies are located in their idle positions (see 57, Fig. 7) and do not interfere with the active one of the steps. For rotating the assemblies a drive shaft 60 is provided, carrying segmental gears 61, 62, 63, which are phased in sequence for engaging the pinions **51*f*, 52*f*, and 53*f*, on the corresponding step assemblies. Each of the gear segments 61, 62 and 63 has the same number of teeth, eleven, in the present instance, so that each revolution of the gear segment produces a full revolution of the step assembly. The phase relationship between the segments is clearly brought out in Figs. 12, 14 and 16, where it will be noticed that the teeth in the gear segments lie in successive 90° quadrants, indicated as "first," "second," and "third" quadrants. It will be apparent that during one revolution of the drive shaft 60** each of the step assemblies will run through its complete cycle of active positions in sequence.

For the purpose of driving the drive shaft 60 a ratchet mechanism 70 is provided, including a ratchet wheel 71 which is secured to the lower end of the drive shaft and which is engaged by a reciprocating pawl 72. Retrograde action is prevented by a retaining pawl 73. The driving pawl 72 is slidably mounted on posts 74, 75 which engage slots 76, 77 in the pawl body. The pawl is urged in the right hand, or driving direction, by means of a coil spring 78. To retract the drive pawl 72 a crank 80 is used, one end of which is pivoted to a plunger 81 in the solenoid 33 and the other end of which extends downwardly into engagement with the pawl, being received in an opening 82. Thus, each time the solenoid 33 is energized, i. e., once at the beginning of each working day, the ratchet pawl 72 takes a tooth, and when the solenoid is de-energized the drive shaft 60 is rotated through one step of movement by the combined action of the spring 78 and the weight of the plunger 81. This rotates the previously active step out of position and the next lower step into position for engagement by the time card. A bottom step 83, which defines the lowest position which may be reached by a card, is in the form of a disk which projects permanently into the path of movement of the card.

It is one of the further features of the invention that locking means are provided for each of these step assemblies so that the step assemblies not being used, i. e., not active at any given time, are positively locked in the inactive position (57 in Fig. 7). This is accomplished by providing locking disks 91, 92, 93 on the drive shaft, cooperating with locking spacers or disk-engaging members **51*g*, 52*g*, and 53*g* on the respective step assemblies. The manner in which locking takes place is brought out by comparing Fig. 11 and Fig. 13, which show the locking disks associated with the step assemblies 51 and 52, respectively. Referring specifically to Fig. 11, the disk 91 has an elongated notch 91*a* of reduced radius, the length of the notch corresponding to the length of the gear segment 61. Thus, whenever the teeth of the gear segment 61 are in mesh with the teeth of the pinion 51*f* the notch 91*a* provides the necessary clearance so that the step assembly 51 may be turned step by step upon advancement of the drive shaft 60. The spacer 51*g* is scalloped out, as indicated at 51*h*, to provide an arcuate locking surface which engages the rim of the disk 91. Such engagement occurs after the gear segment 61 has done its work, i. e., after the step assembly has rotated through one complete revolution back to its idle position. The locking action is illustrated in Fig. 13, which shows that the second step assembly is securely locked during the time that the first step assembly is being rotated. In the latter figure it will be noted that the rim of the locking disc 92 has entered the scalloped portion 52*h* of the spacer 52*g*, thereby insuring that the second step assembly is positively locked in its inactive position. Because of the positive nature of the locking action, the step assembly cannot be jarred out of place by shock or vibration and the positioning is, moreover, not dependent upon friction in the mechanism which may vary over wide limits throughout the life of the device. During the time that the first step assembly 51 is active it will be understood that the third assembly 53 is positively locked in the same manner as the step assembly 52** just previously referred to.

In accordance with one of the more detailed aspects of the present invention, means are provided for enabling the step assemblies to move or retreat rearwardly in the event that a card or other foreign object is left in the recorder during a lift transition, for example, overnight. When the transition takes place there is an instant of time in which there is no step in active blocking position and consequently a card left in the recorder may drop down a distance of several steps before the transition is complete. To prevent the jamming which would otherwise occur when the new step swings into position, the carriage 44 which mounts the spindle 46 is arranged for pivoting about the drive shaft 60 and is biased into its forward or active position. The mounting is simply accomplished by providing appropriate holes at the upper and lower lateral ends of the carriage 44, which holes are engaged by the drive shaft 60 and by providing a coil spring 95 which is suitably anchored to the frame of the device as shown. The action of the movable carriage as shown in Fig. 18 where the carriage 44 is illustrated in its backwardly cammed position as a result of obstruction by the inserted card 22. After the offending card is removed, the carriage is free to return to its normal position under the urging of the spring 95, thereby restoring the active step to its normal blocking position.

It is one of the novel features of the present invention that the lift mechanism can, with minimum modification or adjustment, be adapted for use with payroll systems and cards having any reasonable length of cycle. For example, where payroll calculations are made on a weekly basis, the lift mechanism may be conditioned to operate on a seven-day cycle. Where the calculations are made on a bi-weekly basis, the cycle may be quickly changed to fourteen days. In the device set up as presently illustrated the time cycle is sixteen days, as required for bi-monthly payroll calculations. As a maximum the lift mechanism may be used for a three-week payroll cycle. Referring to the present construction, provision is made for causing the drive shaft 60 to step idly at the rate of one step per minute in order to bridge, or fill out, the unwanted steps. The total number of movable steps in the device shown is 15. These, combined with the permanent bottom step 83, results in a total of sixteen steps. Since the maximum capacity of the stepping mechanism is twenty-two, corresponding to the number of teeth on the drive ratchet wheel 71, means are provided for causing the ratchet wheel 71 to undergo six idle steps of movement. This is accomplished by providing a cam 100 on the drive shaft 60, the cam serving to control an auxiliary shorting switch 101 having a cam follower arm 102. In the present instance, the cam 100 is conveniently secured to the ratchet wheel 71 by means of screws 103, the length of the cam being tailored to the desired number of idle steps.

To understand the manner in which the auxiliary shorting switch 101 produces the idle steps in the lift mechanism, reference is again made to Fig. 1*a*. Here it will be noted that the switch 101 is connected in parallel with the switch 32 in the lift program device. Under normal circumstances the cam 100 is inactive, i. e., out of engagement with the cam follower 102 on the switch and consequently stepping of the lift mechanism is completely under the control of the lift program device. However, when the drive shaft 60 rotates around into a position in which the idle steps are called for, the cam 100 becomes effective to close the switch 101. This connects the lift solenoid 33 directly to the input lines from the master clock to cause stepping of the lift mechanism at the beginning of each subsequent minute for a period of six minutes. As a result of the sixth, or last, idle stepping movement, the cam follower 102 reaches the trailing end of the cam and drop-off takes place. By this time the top step on the step assembly 51 has been rotated into its active position to begin the active portion of the lift cycle and the successive steps will be brought into action in the usual fashion on successive days thereafter.

The device described above may be readily modified for different pay cycles simply by changing the number of steps and by correspondingly changing the length of the cam 100. For example, if a two-week or a fourteen-day cycle were desired, the top two steps **51*a* and 51*b* on the step assembly 51 would be slipped off by loosening the collar 58 after which the auxiliary cam 100** would be replaced by a slightly longer cam providing two additional idle steps. This is a matter of but a few minutes work on the part of a serviceman, and it will be apparent that similar modifications may be made to provide other cycles.

As a still further feature of the present construction, the spindle 46 carrying the step assemblies is mounted for endwise movement and biased upwardly to respond to a card bottomed in the recorder for automatic actuation of the printing unit. Referring to Fig. 3, it will be noted that the upper end of the spindle is journaled in a bushing 110 while the lower end is journaled in an elongated bushing 111 which is centrally relieved to accommodate a coil spring 112 telescoped over the lower end of the spindle, the coil spring being effective to urge the spindle 46 normally upward. The normal position is determined by a collar 113 on the shaft arranged to abut the bushing 111.

Positioned in the path of endwise movement of the spindle 46 is a switch 115 having a movable contact 116 and a fixed contact 117. Arranged in series with the contact is a source of voltage 118 and a printing solenoid 119. The printing solenoid is not per se part of the present invention and the printing arrangement may, for example, correspond to that shown in the above-mentioned Lorenz patent application. The switch 115 is shown in simplified form simply to illustrate the principle involved, and in a commercial embodiment a "one-shot" switch may be employed similar to that shown in the Lorenz patent application in order to increase the positiveness of the printing operation. Regardless of the specific switch design it will be apparent that the present construction provides a simple and effective means for automatically producing imprinting by the bottoming of a time card in the recorder, thereby facilitating one-hand operation by the employee.

It is to be particularly noted that only one assembly, moving as a single part, need be actuated in order to operate the switch, namely, the spindle 46 and the parts which are assembled thereon. Aside from the biased force of the spring, the only forces which need be overcome by the card are the forces of friction in the bushings 110, 111, combined with whatever frictional force may exist at the teeth of the gear segments and at the peripheries of the locking disks. The friction at the bushings may be destroyed provided the bushings are properly in line and the remaining frictional forces are also extremely low during the intervals between the transition from one step to another. Consequently, it is found that the printing switch mechanism requires that very little force be exerted by the time card.

It is, of course, possible that the card may be subjected to larger forces at its leading edge as the result of careless or rough insertion by an employee. The present device insures, however, that such forces are distributed along the edge of the card to minimize the possibility of breakdown at any one point. Thus, it will be noted that each of the steps may be on the order of one-half inch in width, notwithstanding that all of the steps radiate from a single center. In addition to providing the wide step for card engagement, each of the steps may have a radial length which is on the order of five-eighths of an inch, enabling the device as a whole to be made extremely compact and therefore useful in a wide variety of time recorder applications.

I claim as my invention:

1. In a workmen's in-and-out time recorder of the like having a receiver for an inserted time card and having a printing unit for printing time data thereon, the combination comprising a frame having a spindle arranged parallel to the path of movement of an inserted card and spaced therefrom, a plurality of rotatable step assemblies stacked on said spindle, each of said step assemblies having a series of card engaging steps arranged in the path of a part-turn helix defining an idle position and a plurality of active positions in which the steps are individually interposed in the path of movement of the card during a cycle of rotation of the step assembly, the steps on said step assemblies all having uniform axial spacing, drive means having provision for driving the same step by step, and coupling devices interposed between the drive means and said step assemblies for cycling the step assemblies in sequence.

2. In a workmen's in-and-out time recorder or the like, having a receiver for an inserted time card and having a printing unit for printing time data thereon, the combination comprising a frame having a spindle arranged parallel to the path of movement of an inserted card and spaced therefrom, a plurality of rotatable step assemblies stacked on said spindle, each of said step assemblies having a series of card engaging steps arranged in the path of a part-turn helix defining an idle position and a plurality of active positions in which the steps are individually interposed in the path of movement of the card during a cycle of rotation of the step assembly, the steps on said step assemblies all having uniform axial spacing, drive means having provision for driving the same step by step, coupling devices interposed between the drive means and said step assemblies for rotating each of the step assemblies through a cycle of rotation in sequence, and means for locking the inactive assemblies in their idle positions.

3. In a workmen's in-and-out time recorder or the like having a receiver for an inserted time card, the combination comprising a printing unit for printing time data on the card, a frame having a spindle arranged parallel to the path of movement of an inserted card and spaced therefrom, a plurality of rotatable step assemblies stacked on said spindle, each of said step assemblies having a series of card engaging steps arranged in the path of a part-turn helix defining an idle position and a plurality of active positions in which the steps are individually interposed in the path of movement of the card during a cycle of rotation of the step assembly, drive means having provision for driving the same step by step, coupling devices interposed between the drive means and said step assemblies for cycling the step assemblies in sequence, said spindle being biased endwise into a normal position and movable against the force of bias in response to bottoming of a card on one of said steps, and means responsive to said movement for operating said printing unit.

4. In a workmen's in-and-out time recorder or the like having a receiver for an inserted time card and having a printing unit for imprinting time data thereon, the combination comprising a frame, a spindle mounted in said frame parallel to the path of movement of an inserted card, a plurality of rotatable step assemblies stacked one above the other on said spindle, each of said step assemblies having a series of radial card engaging steps arranged along the path of a part-turn helix defining an idle position and a plurality of active positions in which the steps are individually interposed in the path of movement of an inserted card during a cycle of rotation of the assembly, each of said assemblies having a drive pinion, a drive shaft arranged parallel to said spindle, said drive shaft having a plurality of driving gears for respectively engaging said drive pinions, said driving gears having drive portions and idle portions out of phase with one another for cycling said step assemblies in sequence, and means for providing timed step-by-step advancement of the drive shaft.

5. In a workmen's in-and-out time recorder or the like having a receiver for an inserted time card and having a printing unit for imprinting time data thereon, the combination comprising a frame, a spindle mounted in said frame parallel to the path of movement of an inserted card, a plurality of rotatable step assemblies stacked one above the other on said spindle, each of said step assemblies having a series of radial card engaging steps arranged along the path of a part-turn helix defining an idle position and a plurality of active positions in which the steps are individually interposed in the path of movement of an inserted card during a cycle of rotation of the assembly, each of said assemblies having a drive pinion, driving means including a drive shaft arranged parallel to said spindle, said drive shaft having a plurality of gear sectors for respectively engaging said drive pinions, said gear sectors being phased sequentially and of such length that the step assemblies are rotated through their cycles of rotation one at a time, and means for locking the inactive ones of said assemblies in their idle positions.

6. In a workmen's in-and-out time recorder or the like having a receiver for an inserted time card and having a printing unit for imprinting time data thereon, the combination comprising a frame, a vertical spindle mounted in said frame parallel to the path of movement of an inserted card, a plurality of rotatable step assemblies stacked one above the other on said spindle, each of said step assemblies having a series of radial card engaging steps arranged along the path of a part-turn helix defining an idle position and a plurality of active positions in which the steps are individually interposed in the path of movement of an inserted card during a cycle of rotation of the assembly, each of said assemblies having a drive pinion, driving means including a drive shaft arranged parallel to said spindle, said drive shaft having a plurality of gear sectors for respectively engaging said drive pinions, said drive shaft having in addition a plurality of locking devices for the respective step assemblies, said gear sectors being phased sequentially and of such length that the step assemblies are rotated through their cycles of rotation one at a time, and said locking devices being so arranged as to lock in idle position the inactive ones of said step assemblies.

7. In a workmen's in-and-out time recorder having a receiver for an inserted card and having a printing unit for imprinting time data thereon, the combination comprising a rotatable step assembly having a plurality of short radially extending steps the ends of which are arranged in the path of a helix, a carriage for rotatably mounting the step assembly, said carriage being bodily biased into a normal active position in which the steps are sequentially interposed in the path of movement of an inserted card for printing by said printing unit, timed means for driving the step assembly step by step, said carriage being mounted for retreating movement relative to the card so that the step assembly is free to rotate in the event that a card is inadvertently left in the recorder during operation of the timed driving means.

8. In a workmen's in-and-out time recorder having a receiver for an inserted card and having a printing unit for imprinting time data thereon, the combination comprising a rotatable step assembly having a plurality of short radially extending steps the ends of which are arranged in the path of a helix, a carriage for rotatably mounting the step assembly, said carriage being biased into a normal active position in which the steps are sequentially interposed in the path of movement of an inserted card for printing by said printing unit, a drive pinion on said step assembly, a drive gear meshing with said drive pinion, means for mounting said carriage for bodily pivoting movement about the axis of the drive gear to permit retreating movement of the carriage relative to the card, and means for providing timed step-by-step advancement of the driving gear.

9. In a workmen's in-an-out time recorder or the like arranged for energization by a source of periodic voltage impulses, the combination comprising a receiver for an inserted card, a printing unit for imprinting time data on the card, a rotatable step assembly having a plurality of radially extending steps arranged thereon in the path of a helix and so positioned that the steps are sequentially interposed in the active position in the path of movement of an inserted card for printing by the printing unit, means including a driving gear for rotating the step assembly, a stepping device for operating said driving gear step by step, a program unit having a switch connected in series with said source of voltage impulses for operating said stepping device at programmed times, and an auxiliary switch coupled to said driving gear for shorting out the switch in the program unit during a portion of the rotation of the driving gear to produce rapid stepping of the step assembly over a portion of its rotative cycle.

10. In a workmen's in-and-out time recorder or the like arranged for energization by a source of periodic voltage impulses, the combination comprising a receiver for an inserted card having a predetermined number of vertical spaces thereon, a printing unit for imprinting time data on the spaces on said card, a step assembly having a plurality of steps, means for projecting the steps one by one into active position in the path of movement of the inserted card, mechanism including a ratchet wheel for ratcheting the step projecting means step-by-step, an electromagnet for operating said mechanism, a program unit having a switch connected to said source of voltage impulses for operating said electromagnet at predetermined times, said step assembly having a number of idle step positions not required for said card, and an auxiliary switch coupled to said ratchet wheel for shorting out the switch in the program unit during a portion of the rotation of the ratchet wheel to produce rapid stepping of the step assembly through said idle positions.

References Cited in the file of this patent

UNITED STATES PATENTS

| | | |
|---|---|---|
| 870,742 | Palmer | Nov. 12, 1907 |
| 908,971 | Dey | Jan. 5, 1909 |
| 2,553,644 | Fehr | May 22, 1951 |